United States Patent
Itagaki et al.

(10) Patent No.: US 6,706,825 B2
(45) Date of Patent: Mar. 16, 2004

(54) FLAME RETARDANT RESIN COMPOSITIONS AND MOLDED ARTICLES

(75) Inventors: Akinari Itagaki, Usui-gun (JP); Masaaki Yamaya, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/377,619

(22) Filed: Mar. 4, 2003

(65) Prior Publication Data

US 2003/0199631 A1 Oct. 23, 2003

(30) Foreign Application Priority Data

Mar. 5, 2002 (JP) ........................................ 2002-058571

(51) Int. Cl.[7] ............................................. C08F 283/02
(52) U.S. Cl. ....................................... 525/464; 524/265
(58) Field of Search ........................... 525/464; 524/265

(56) References Cited

U.S. PATENT DOCUMENTS

| | | | |
|---|---|---|---|
| 3,971,756 A | | 7/1976 | Bialous et al. |
| 4,197,384 A | | 4/1980 | Bialous et al. |
| 4,221,728 A | * | 9/1980 | Jaquiss et al. ............ 525/464 |
| 4,265,801 A | | 5/1981 | Moody et al. |
| 4,387,176 A | | 6/1983 | Frye |
| 4,983,658 A | | 1/1991 | Kress et al. |
| 6,184,312 B1 | * | 2/2001 | Yamamoto et al. ......... 525/474 |
| 6,541,548 B2 | * | 4/2003 | Weidner et al. ............ 524/108 |

FOREIGN PATENT DOCUMENTS

| | | |
|---|---|---|
| EP | 1 026 204 | 8/2000 |
| JP | 51-45160 | 4/1976 |
| JP | 54-36365 | 3/1979 |
| JP | 54-102352 | 8/1979 |
| JP | 61-55145 | 3/1986 |
| JP | 62-297352 | 12/1987 |
| JP | 64-22958 | 1/1989 |
| JP | 2-32154 | 2/1990 |
| JP | 2-69557 | 3/1990 |
| JP | 2-115262 | 4/1990 |
| JP | 4-226159 | 8/1992 |
| JP | 4-298554 | 10/1992 |
| JP | 5-179123 | 7/1993 |
| JP | 6-128434 | 5/1994 |
| JP | 6-336547 | 12/1994 |
| JP | 7-33971 | 2/1995 |
| JP | 7-126510 | 5/1995 |
| JP | 8-165392 | 6/1996 |
| JP | 8-176425 | 7/1996 |
| JP | 8-176427 | 7/1996 |
| JP | 10-139964 | 5/1998 |
| JP | 10-147702 | 6/1998 |
| JP | 11-140294 | 5/1999 |
| JP | 11-222559 | 8/1999 |
| JP | 2000-226527 | 8/2000 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A flame retardant resin composition is provided comprising (A) 100 pbw of a resin comprising 10–100% by weight of an aromatic polycarbonate resin and 90-0% by weight of another thermoplastic resin, (B) 0.1–9.9 pbw of an organopolysiloxane containing silicon atom-bonded phenyl groups, and (C) 0.1–9.9 pbw of an organopolysiloxane containing silicon atom-bonded methyl groups and Si—H groups and free of an aromatic hydrocarbon group. The composition has satisfactory flame retardant effects and safety and minimal environmental load features, and molded articles can be effectively produced therefrom.

16 Claims, No Drawings

FLAME RETARDANT RESIN COMPOSITIONS AND MOLDED ARTICLES

TECHNICAL FIELD

This invention relates to aromatic polycarbonate base resin compositions having improved flame retardance and articles made through molding thereof.

BACKGROUND OF THE INVENTION

Due to excellent mechanical, electrical and thermal properties, molded parts of aromatic polycarbonate resins have been commonly used as engineering plastics in a wide variety of applications including business machine, electric and electronic, automobile and building fields. To overcome the drawbacks of aromatic polycarbonate resins including somewhat poor processability and moldability, a number of polymer blends with other thermoplastic resins such as polystyrene resins, acrylonitrile-butadiene-styrene (ABS) resins, and polyester resins have been developed. Among others, polymer alloys with ABS resins have been widely used in automobile, business machine and electric and electronic fields.

In the current applications including business machines, electric appliances and the like, it is strongly desired to render the resin materials flame retardant. To meet such needs, numerous flame retarding techniques have been proposed for aromatic polycarbonate resins and polymer alloys thereof with other thermoplastic resins.

In the prior art, for rendering aromatic polycarbonate resins and polymer alloys thereof flame retardant, it was a common practice to use an organic halide flame retardant containing bromine in combination with a flame retardant aid such as antimony trioxide as disclosed in JP-A 64-22958. Resin compositions of this formulation are made flame retardant to a relatively large extent, but raise environmental problems of giving off harmful or toxic substances during fire occurrence or combustion upon disposal by incineration. In addition, the production of molded parts from such resin compositions has the problem that if thermally decomposed, the flame retardant gives off hydrogen halide which can cause corrosion of molds or detract from physical properties of molded resin parts themselves. For this reason, efforts were made on the technique of achieving flame retardance without resorting to organic halide compounds containing bromine.

For example, attempts were made to use phosphate esters in combination with polytetrafluoroethylene having a fibrillating ability. JP-A 61-55145 describes an anti-fouling thermoplastic molding composition comprising an aromatic polycarbonate resin, ABS resin, AS resin, halide, phosphate and polytetrafluoroethylene. JP-A 2-32154 describes a flame retardant, high impact polycarbonate molding composition comprising an aromatic polycarbonate resin, ABS resin, AS resin, phosphate and polytetrafluoroethylene. It is disclosed in these patents that in addition to the foregoing components, stabilizers, pigments, flow aids, fillers, reinforcements, mold release agents and/or antistatic agents may be included in the compositions. JP-A 2-69557 describes a flame retardant, thermoplastic polycarbonate molding composition comprising an aromatic polycarbonate resin, ABS resin, AS resin, specific phosphate and polytetrafluoroethylene. JP-A 2-115262 describes a flame retardant composition comprising an aromatic polycarbonate resin, ABS resin, and oligomeric phosphate. These flame retarding formulations predominantly using phosphates suffer from several problems including the heavy loading of flame retardants and the volatility of phosphates which leads to poor heat resistance or causes mold contamination.

By contrast, silicone resins have high heat resistance, give off no toxic gases upon combustion, and are safe in themselves. Silicone resins of several types have been proposed as the flame retardant for polycarbonate resins. In fact, silicone resins are used as the flame retardant in resin compositions of which business machine parts are made.

U.S. Pat. No. 4,387,176 (Frye), JP-A 4-226159 and JP-A 7-33971 describe flame retardant resin compositions to which silicone resins comprising monofunctional siloxane units and tetrafunctional siloxane units are added. JP-A 54-36365 describes a flame retardant composition to which a substantially solid silicone resin containing at least 80% by weight of trifunctional siloxane units is added. JP-A 10-139964 and JP-A 11-140294 describe flame retardant compositions to which a substantially solid silicone resin comprising di- and trifunctional siloxane units, having a relatively high molecular weight and bearing phenyl groups is added. Allegedly, these silicone resins having branched structures offer improved heat resistance, and the silicone resin bearing phenyl groups exerts flame retardant effects by forming an incombustible Si—C ceramic layer through mutual coupling of aromatic rings on the surface of the resin to which it is added.

Also, JP-A 54-102352 describes a thermoplastic resin composition comprising an aromatic polycarbonate resin and a silicone oligomer containing poly-substituted ethoxy groups; JP-A 6-306265 describes a flame retardant polycarbonate resin composition comprising as essential components an aromatic polycarbonate resin, an alkali (or alkaline earth) metal salt of perfluoroalkanesulfonic acid, and an organic siloxane having alkoxy, vinyl and phenyl groups; JP-A 6-336547 describes a flame retardant polycarbonate resin composition comprising an aromatic polycarbonate resin, an alkali (or alkaline earth) metal salt of perfluoroalkanesulfonic acid, and an organopolysiloxane containing organooxysilyl groups each bonded to a silicon atom through a divalent hydrocarbon group; and JP-A 11-222559 and JP-A 2000-226527 describe a flame retardant composition comprising a synthetic resin containing aromatic rings in a molecule and an organopolysiloxane containing phenyl and alkoxy groups. It is believed that when these resin compositions are burned, organopolysiloxane molecules or an organopolysiloxane and a resin component are joined through oxidative decomposition and crosslinking of alkoxy or organooxy groups, to form a network structure which is fixed in proximity to the burning portion, thus exerting flame retardant effects.

Silicone compounds of other types are also employed. JP-A 51-45160 describes an organopolysiloxane containing Si—H groups; JP-A 6-128434 describes an organopolysiloxane resin comprising vinyl group-bearing siloxane units; JP-A 8-176425 describes an organopolysiloxane containing epoxy groups; and JP-A 8-176427 describes a polycarbonate resin modified with a phenolic hydroxyl group-bearing organopolysiloxane.

Attempts have also been made to add various silicone resins to polymer alloys of aromatic polycarbonate resins with other thermoplastic resins. JP-A 62-297352 describes to blend silicone rubber for improving chemical resistance, weather resistance and heat resistance. JP-A 7-126510 describes that impact resistance can be improved by including a composite rubber of the structure in which a polyorganosiloxane rubber component and a polyalkyl (meth)

acrylate rubber component are entangled together in an inseparable manner.

Likewise, it has been proposed to add silicone resins to such polymer alloys for the purpose of improving flame retardance. JP-A 4-298554 describes the addition of a phosphate ester and a polyorganosiloxane, and illustrates the use of polymethylphenylsiloxane and low density polyethylene-modified polysiloxanes in Examples. Additionally, JP-A 5-179123 describes a flame retardant composition based on a phosphorus compound and a boron compound to which a polyorganosiloxane and/or a fluoro-resin is added; JP-A 8-165392 describes the combined use of a phosphate flame retardant and an organohydrogenpolysiloxane; and JP-A 10-147702 describes the combined use of a phosphate flame retardant and a polyorganosiloxane graft copolymer.

In all the flame retardant compositions described above, however, silicone flame retardants are essentially used as co-agents to be combined with phosphate flame retardants. None of the foregoing silicone flame retardants can render polymer alloys flame retardant when used alone.

In the fields of business machines, electric appliances and the like, there is an increasing propensity toward size and weight reductions and resource savings. To comply with such a need, it is desired to have an aromatic polycarbonate resin composition which is given a high degree of flame retardance using a safe material that gives off no corrosive gases or contaminants upon molding, and which allows molded parts of such flame retarded resin composition to be recycled for reuse.

SUMMARY OF THE INVENTION

An object of the invention is to provide a flame retardant resin composition comprising an aromatic polycarbonate resin or a polymer alloy of an aromatic polycarbonate resin with another thermoplastic resin, which is fully flame retardant and safe and imposes minimal environmental loads, while eliminating the use of organic halogen flame retardants giving rise to environmental and manufacturing problems and phosphate flame retardants giving rise to problems of poor heat resistance and mold contamination as mentioned above. Another object is to provide molded parts of the composition.

The inventors have found that a resin composition comprising an aromatic polycarbonate resin or a polymer alloy of an aromatic polycarbonate resin with another thermoplastic resin is endowed with flame retardance and anti-dripping by compounding therein an organopolysiloxane having silicon atom-bonded phenyl groups in a molecule and another organopolysiloxane having silicon atom-bonded methyl groups and Si—H groups, but free of aromatic hydrocarbon groups in a molecule.

No satisfactory flame retardant effects are exerted when either an organopolysiloxane containing phenyl groups or an organopolysiloxane containing methyl and Si—H groups (but free of aromatic hydrocarbon groups) is added to the aromatic polycarbonate resin. Quite unexpectedly, significant improvements in flame retardant effects are achieved when both an organopolysiloxane containing phenyl groups which is effectively dispersible in the aromatic polycarbonate resin and an organopolysiloxane containing methyl and Si—H groups (but free of aromatic hydrocarbon groups) which is effective for rendering flame retardant thermoplastic resins including aromatic polycarbonate resins are added to the aromatic polycarbonate resin. Even though the silicone flame retardant is used alone, the resin composition is rendered fully flame retardant. This resin composition offers a high degree of flame retardance despite the absence of halogen, phosphorus, antimony or the like, and thus gives off no toxic gases upon combustion. Since the flame retardant effects are achieved through the light loading of the silicone flame retardant, the composition can fully derive the performance that the aromatic polycarbonate resin originally possesses.

Accordingly, the invention in one aspect provides a flame retardant resin composition comprising (A) 100 parts by weight of a resin comprising 10 to 100% by weight of an aromatic polycarbonate resin and 90 to 0% by weight of a thermoplastic resin other than the aromatic polycarbonate resin, (B) 0.1 to 9.9 parts by weight of an organopolysiloxane containing phenyl groups attached to silicon atoms in a molecule and having the average compositional formula (1):

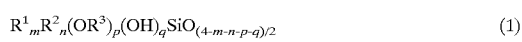

$$R^1{}_m R^2{}_n (OR^3)_p (OH)_q SiO_{(4-m-n-p-q)/2} \qquad (1)$$

wherein $R^1$ is phenyl, $R^2$ is hydrogen or a monovalent hydrocarbon group of 1 to 6 carbon atoms excluding phenyl, $R^3$ is a monovalent hydrocarbon group of 1 to 4 carbon atoms, letters m, n, p and q are numbers satisfying $0.1 \leq m \leq 2.0$, $0.2 \leq n \leq 2.5$, $0 \leq p \leq 1.5$, $0 \leq q \leq 0.35$ and $0.9 \leq m+n+p+q \leq 2.8$, and (C) 0.1 to 9.9 parts by weight of an organopolysiloxane containing methyl and Si—H groups attached to silicon atoms in a molecule and free of an aromatic hydrocarbon group, the amount of components (B) and (C) combined being 0.2 to 10 parts by weight.

An article made by molding the flame retardant resin composition is another embodiment of the present invention.

DETAILED DESCRIPTION OF THE INVENTION

In the flame retardant resin composition of the invention, any aromatic polycarbonate resin may serve as component (A) as long as molded parts can be formed as from conventional thermoplastic aromatic polycarbonate resins. Aromatic polycarbonate resins produced by different processes can be used equivalently. In general, use is preferably made of aromatic polycarbonate resins produced by reacting a dihydric phenol with a carbonate precursor according to the solution or melt process.

Typical examples of the dihydric phenol used herein include, but are not limited to, 2,2-bis(4-hydroxyphenyl)-propane, also known as bisphenol A, bis(4-hydroxyphenyl)-methane, 1,1-bis(4-hydroxyphenyl)ethane, 2,2-bis(4-hydroxy-3,5-dimethylphenyl)propane, 2,2-bis(4-hydroxy-3-methyl-phenyl)propane, and bis(4-hydroxyphenyl)sulfone. Of these, the preferred dihydric phenols are bis(4-hydroxyphenyl)-alkanes, and more preferably bisphenol A. The dihydric phenols may be used alone or in admixture of two or more. Examples of the carbonate precursor include carbonyl halides, diaryl carbonates and haloformates, and more illustratively, phosgene, diphenyl carbonate, dihaloformates of dihydric phenols, and mixtures thereof.

In the preparation of aromatic polycarbonate resins, any appropriate molecular weight regulator, branching agent, catalyst for promoting reaction, and other agents may be used in a conventional manner.

The aromatic polycarbonate resins may also be branched polycarbonate resins having a tri- or polyfunctional aromatic compound copolymerized therewith. Also useful are polycarbonate resins modified with organopolysiloxanes as described in the above-referred JP-A 8-176427. Such aromatic polycarbonate resins may be used alone or as mixtures of two or more.

In the flame retardant composition of the invention, another thermoplastic resin may constitute component (A) with the aromatic polycarbonate resin. Any desired thermoplastic resin other than the aromatic polycarbonate resin may be used as long as molded parts can be conventionally formed therefrom. Typical examples of the other thermoplastic resin include polystyrene resins, acrylonitrile-butadiene-styrene (ABS) resins, polyester resins, and polyamide resins, as well as polyethylene, polypropylene, polybutene, polysulfone, polyvinyl acetate, ethylene-vinyl acetate copolymers, poly(methyl methacrylate), polyethylene oxide, cellulose acetate and cellulose nitrate. Of these thermoplastic resins, ABS resins are preferred since they are customarily used as polymer alloys with aromatic polycarbonate resins. The thermoplastic resins may be used alone or as mixtures of two or more.

Some of these thermoplastic resins are described in detail.

Polystyrene resins which can be used herein are polymers produced through polymerization of unsaturated monomers containing aromatic vinyl monomers. Such polymers modified with rubbery polymers are also included.

Aromatic vinyl monomers used as unsaturated monomers include styrene, alpha-methylstyrene, vinyltoluene, tert-butylstyrene, and halostyrenes. Together with these monomers, there may be used one or more monomers selected from among (meth)acrylic acid, (meth)acrylates, maleimide monomers and unsaturated dicarboxylic acid anhydride monomers. Exemplary (meth)acrylates are methyl acrylate, ethyl acrylate, methyl methacrylate and ethyl methacrylate. Exemplary maleimide monomers are maleimide, N-methylmaleimide, N-ethylmaleimide, N-propylmaleimide, N-hexylmaleimide, N-cyclohexylmaleimide, and N-phenylmaleimide. Exemplary unsaturated dicarboxylic acid anhydride monomers are maleic anhydride, methylmaleic anhydride, 1,2-dimethylmaleic anhydride, ethylmaleic anhydride, and phenylmaleic anhydride.

It is understood that the polystyrene resins may be prepared by any of well-known processes including bulk polymerization, solution polymerization, suspension polymerization and emulsion polymerization.

Preferred examples of the polystyrene resins used herein include polystyrene, high impact polystyrene, styrene-methacrylic acid copolymers, styrene-methyl methacrylate copolymers and styrene-maleic anhydride copolymers, and rubber-modified products thereof.

ABS resins which can be used herein are graft polymers produced through graft polymerization of vinyl monomers containing aromatic vinyl monomers with rubbery polymers. Mixtures of polymers produced through polymerization of vinyl monomers containing aromatic vinyl monomers and the graft polymers are also useful. The graft polymers are produced by graft polymerizing an aromatic vinyl monomer and one or more monomers selected from (meth)acrylonitrile, (meth)acrylates, maleimide monomers and unsaturated dicarboxylic acid anhydride monomers with rubbery polymers having a glass transition temperature of 10° C. or lower.

Examples of the aromatic vinyl monomer used herein include styrene, alpha-methylstyrene, vinyltoluene, tert-butylstyrene and halostyrenes. Exemplary (meth)acrylates are methyl acrylate, ethyl acrylate, methyl methacrylate and ethyl methacrylate. Exemplary maleimide monomers are maleimide, N-methylmaleimide, N-ethylmaleimide, N-propylmaleimide, N-hexylmaleimide, N-cyclohexylmaleimide, and N-phenylmaleimide. Exemplary unsaturated dicarboxylic acid anhydride monomers are maleic anhydride, methylmaleic anhydride, 1,2-dimethylmaleic anhydride, ethylmaleic anhydride, and phenylmaleic anhydride. Of these, preferred monomers are styrene and acrylonitrile and/or methyl methacrylate. For each type, these monomers may be used alone or in admixture of two or more.

It is understood that the graft polymers may be prepared by any of well-known processes including bulk polymerization, solution polymerization, suspension polymerization and emulsion polymerization.

Examples of the rubbery polymers used in the graft polymers include butadiene base rubber polymers, acrylic rubber polymers, ethylene-propylene base rubber polymers and silicone base rubber polymers. Suitable butadiene base rubber polymers include polybutadiene, butadiene-styrene copolymers and butadiene-acrylonitrile copolymers. Suitable acrylic rubber polymers include homopolymers of acrylate monomers such as ethyl acrylate, butyl acrylate and 2-ethylhexyl acrylate, and copolymers of such monomers in a major proportion with other copolymerizable monomers. Preferred ethylene-propylene base rubber polymers are those polymers in which the ratio of ethylene/propylene is from 80/20 to 60/40 and which may contain a diene component. Suitable silicone base rubber polymers are polyorganosiloxane rubber polymers predominantly comprising recurring units of dimethylsiloxane. Also useful are composite rubbers of a silicone base rubber component and an acrylic rubber component, and composite rubbers of a butadiene base rubber component and an acrylic rubber component. In the practice of the invention, butadiene base rubber polymers are preferred.

It is understood that the rubbery polymers may be prepared by any of well-known processes including bulk polymerization, solution polymerization, suspension polymerization and emulsion polymerization.

Polymers to be blended with the graft polymers may be polymers produced through polymerizing the monomers used in the graft polymers. Preferred polymers used herein include α-methylstyrene-acrylonitrile copolymers, styrene-acrylonitrile copolymers, α-methylstyrene-methyl methacrylate copolymers, styrene-methyl methacrylate copolymers, α-methylstyrene-acrylonitrile-N-phenylmaleimide copolymers, styrene-acrylonitrile-N-phenylmaleimide copolymers, and styrene-N-phenylmaleimide-maleic anhydride copolymers. These polymers may be used alone or in combination of two or more. It is understood that these polymers may be prepared by any of well-known processes including bulk polymerization, solution polymerization, suspension polymerization and emulsion polymerization.

Polyester resins which can be used herein are polymers produced through condensation reaction of predominantly dicarboxylic acids or ester-forming derivatives thereof with diols or ester-forming derivatives thereof. Examples of suitable dicarboxylic acid component include terephthalic acid, isophthalic acid, naphthalene-2,6-dicarboxylic acid, naphthalene-1,5-dicarboxylic acid, naphthalene-2,7-dicarboxylic acid, adipic acid, sebacic acid, and other carboxylic acids and ester-forming derivatives thereof. Examples of suitable diols include ethylene glycol, tetramethylene glycol, hexamethylene glycol, diethylene glycol, cyclohexane dimethanol, 1,4-bisoxyethoxybenzene, bisphenol A, and other diols and ester-forming derivatives thereof. These carboxylic acid components and diol components each may be used alone or as mixtures of two or more. The preferred polyester resins used herein are polyethylene terephthalate and/or polybutylene terephthalate.

Polyamide resins which can be used herein are obtained by polymerizing a compound having carboxyl and amino groups or a lactam thereof, or a diamine and a dicarboxylic acid, or a compound having carboxyl and amino groups or a lactam thereof, a diamine and a dicarboxylic acid. Examples of suitable compound having carboxyl and amino groups or lactam thereof include aminocaproic acid, butyrolactam, pivalolactam, caprolactam, capryllactam, enantholactam, undecanolactam, dodecanolactam and aminobenzoic acid. Suitable diamines include trimethylenediamine, tetramethylenediamine, pentamethylenediamine, octamethylenediamine, hexamethylenediamine, trimethylhexamethylenediamine, m-phenylenediamine, p-phenylenediamine, m-xylenediamine, and p-xylenediamine. Suitable dicarboxylic acids include sebacic acid, octadecanedioic acid, suberic acid, glutaric acid, pimelic acid, and adipic acid.

Polyamides which can be used herein may be either crystalline or amorphous or a mixture thereof. Illustrative of the polyamides are polyamide 4, polyamide 6, polyamide 7, polyamide 8, polyamide 11, polyamide 12, polyamide 6-6, polyamide 6-9, polyamide 6-10, polyamide 6-11, polyamide 6-12, polyamides obtained from terephthalic acid and/or isophthalic acid and trimethylhexamethylenediamine, and polyamides obtained from adipic acid and m-xylenediamine. These polyamides may be used alone or in admixture of two or more.

As component (A) in the flame retardant resin composition of the invention, the aromatic polycarbonate resin may be used alone or in admixture with a thermoplastic resin other than the aromatic polycarbonate resin as mentioned above. The blend proportion of the aromatic polycarbonate resin to the other thermoplastic resin should be in the range from 10/90 to 100/0 by weight. In order that the resin composition maintain satisfactory levels of flame retardance, impact resistance, processing and molding, the blend proportion should preferably be in the range from 30/70 to 95/5 by weight and more preferably in the range from 50/50 to 95/5 by weight.

Component (B) in the flame retardant resin composition of the invention is an organopolysiloxane containing phenyl groups attached to silicon atoms in a molecule and having the average compositional formula (1):

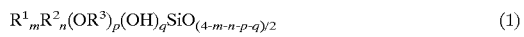

$$R^1{}_m R^2{}_n (OR^3)_p (OH)_q SiO_{(4-m-n-p-q)/2} \qquad (1)$$

wherein $R^1$ is phenyl, $R^2$ is hydrogen or a monovalent hydrocarbon group of 1 to 6 carbon atoms excluding phenyl, $R^3$ is a monovalent hydrocarbon group of 1 to 4 carbon atoms, letters m, n, p and q are numbers satisfying $0.1 \leq m \leq 2.0$, $0.2 \leq n \leq 2.5$, $0 \leq p \leq 1.5$, $0 \leq q < 0.35$ and $0.9 \leq m+n+p+q \leq 2.8$.

From the standpoints of dispersion in the aromatic polycarbonate resin and flame retardant effects, the organopolysiloxane (B) should contain silicon atom-bonded phenyl groups in a molecule. From the same standpoints, the letter m representing the moles of substituting phenyl groups ($R^1$) per mole of silicon atoms should be from 0.1 to 2.0, and preferably from 0.15 to 1.4.

On the other hand, $R^2$ is hydrogen or a monovalent hydrocarbon group of 1 to 6 carbon atoms excluding phenyl. Inclusion of a suitable amount of the substituent group mitigates the steric hindrance of an organopolysiloxane molecule containing bulky phenyl groups and thus improves the degree of spatial freedom, for facilitating superposition of phenyl groups, thereby enhancing flame retardant effects. When $R^2$ is H, flame retardant effects due to Si—H groups having reactivity are also expectable. Therefore, $R^2$ is preferably selected from among hydrogen, $C_{1-6}$ alkyl groups such as methyl, ethyl, propyl, butyl and hexyl, and $C_{2-6}$ alkenyl groups such as vinyl, allyl and butenyl. Inter alia, hydrogen, methyl and vinyl are preferred in the industry from the standpoint of mitigating steric hindrance. For the above-mentioned effects, the value of n in formula (1) representing the content of $R^2$ should be in the range from 0.2 to 2.5, preferably from 0.5 to 2.1.

When alkoxy groups are incorporated in an organopolysiloxane, oxidative decomposition and crosslinking of alkoxy groups take place during combustion, to join the organopolysiloxane with the aromatic polycarbonate resin to form a flame retarded layer in proximity to the burnt portion, thus preventing flaming particles from dropping, that is, dripping. $R^3$ in the alkoxy group in formula (1) is a monovalent hydrocarbon group of 1 to 4 carbon atoms such as methyl, ethyl, propyl, isopropyl, butyl or isobutyl. Of these, methyl is preferred from the industrial aspect. Alkyl groups having more than 4 carbon atoms form less reactive alkoxy groups, and no substantial flame retardant effects are expectable when such alkoxy groups are incorporated. Inclusion of too much alkoxy groups provides low molecular weight organopolysiloxanes which can volatilize off by heat during combustion prior to crosslinking reaction, resulting in increased losses. For this reason, the value of p in formula (1) representing the content of alkoxy groups should be 1.5 or less, and preferably 1.2 or less. The lower limit of p is preferably at least 0.05 and more preferably at least 0.1.

As a result of the production process, some silanol groups are left in the organopolysiloxane. Such silanol groups are least reactive and contribute little to flame retardance. When storage stability and stability during melt working with the resin as component (A) and moldability are taken into account, the value of q in formula (1) representing the content of silanol groups should be 0.35 or less, preferably 0.3 or less, and most preferably 0.

The phenyl group-bearing organopolysiloxane (B) may have any desired composition and structure as long as the above requirements are met. A mixture of two or more organopolysiloxanes which differ in composition and/or structure is useful. Most preferred are organopolysiloxanes containing phenyl and methyl groups attached to silicon atoms in a molecule and having a branched structure, organopolysiloxanes containing phenyl, methyl and $C_{1-4}$ alkoxy groups attached to silicon atoms in a molecule, and organopolysiloxanes containing phenyl and methyl attached to silicon atoms and Si—H groups in a molecule in which the Si—H content is in the range of 0.1 to 1.2 mol/100 g.

The term "branched structure" as used herein means that the organopolysiloxane contains T units and/or Q units in its structure. The "Si—H content" as used herein represents the moles of Si—H groups contained per 100 g of the organopolysiloxane, as will be defined later.

The molecular weight of the organopolysiloxane (B) used herein is not critical. However, if the molecular weight is too high or too low, dispersion in the aromatic polycarbonate resin and flame retardant effects become insufficient. Therefore, the sum of m+n+p+q in formula (1) should be in the range from 0.9 to 2.8, and preferably from 1.1 to 2.6. More specifically, the weight average molecular weight of the organopolysiloxane (B) is preferably in the range of 410 to 10,000, and more preferably 600 to 10,000.

The phenyl group-bearing organopolysiloxane (B) can be prepared by well-known methods. For example, the end organopolysiloxane can be produced by subjecting a mixture of organochlorosilanes corresponding to the particular structure of the end product to co-hydrolysis optionally in the presence of alcohols having 1 to 4 carbon atoms, while removing hydrochloric acid and low-boiling by-products. Alternatively, when alkoxysilanes, silicone oils or cyclic siloxanes containing organic residues (such as phenyl, methyl or the like) or Si—H bonds in the molecule are used as the starting material, polymerization reaction is carried out in the presence of an acid catalyst such as hydrochloric acid, sulfuric acid or methanesulfonic acid, and optionally with water added for hydrolysis. After the acid catalyst used and low-boiling by-products are similarly removed, the end organopolysiloxane is obtained.

In the composition of the invention, the phenyl group-bearing organopolysiloxane (B) should be added in amounts of 0.1 to 9.9 parts by weight, preferably 0.2 to 4 parts by weight, per 100 parts by weight of component (A). Less than 0.1 part of the phenyl group-bearing organopolysiloxane (B) is insufficient to achieve the desired dispersion enhancing and flame retarding effects whereas more than 9.9 parts achieves no further improvement in flame retardance and rather has adverse impacts on the outer appearance and strength of molded parts.

Component (C) in the flame retardant resin composition of the invention is an organopolysiloxane containing silicon atom-bonded methyl groups and hydrogen atoms (Si—H groups) in a molecule and free of an aromatic hydrocarbon group. As long as this requirement is met, the organopolysiloxane may have either a linear structure or a branched structure. Specifically, silicone compounds having methyl groups and Si—H groups at any of side chains, ends and branching sites in the molecular structure, or combinations thereof are useful. Such organopolysiloxanes may be used alone or as mixtures of two or more organopolysiloxanes having different composition or structure.

In general, the structure of silicone compounds is constructed by an arbitrary combination of siloxane units of four types shown below.

M units: monofunctional siloxane units such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$, $(CH_3)(C_6H_5)(CH_2=CH)SiO_{1/2}$, etc.

D units: difunctional siloxane units such as $(CH_3)_2SiO$, $H(CH_3)SiO$, $H_2SiO$, $H(C_6H_5)SiO$, $(CH_3)(CH_2=CH)SiO$, $(C_6H_5)_2SiO$, etc.

T units: trifunctional siloxane units such as $(CH_3)SiO_{3/2}$, $(C_3H_7)SiO_{3/2}$, $HSiO_{3/2}$, $(C_6H_5)SiO_{3/2}$, $(CH_2=CH)SiO_{3/2}$, etc.

Q units: tetrafunctional siloxane units represented by $SiO_2$

Illustratively, the organopolysiloxanes which can serve as component (C) may have those structures of rational formulae: $M_2$, $D_n$, $T_p$, $M_mD_n$, $M_mT_p$, $M_mQ_q$, $M_mD^nT_p$, $M_mD_nQ_q$, $M_mT_pQ_q$, $M_mD_nT_pQ_q$, $D_nT_p$, $D_nQ_q$, and $D_nT_pQ_q$. Of these, the preferred organopolysiloxane structures are $M_mD_n$, $M_mT_p$, $M_mD_nT_p$ and $M_mD_nQ_q$, with $M_mD_n$ and $M_mD_nT_p$ being more preferred. The coefficients m, n, p and q in the above rational formulae are positive numbers representing the degree of polymerization of respective siloxane units, with the sum of the coefficients in each rational formula becoming the degree of polymerization of that organopolysiloxane. When any one of m, n and p has a value of at least 2, the mono-, di- or trifunctional siloxane units associated with that coefficient may be siloxane units of two or more species which differ in hydrogen atoms or organic residues bonded thereto.

Among the mono- to trifunctional siloxane units mentioned above, siloxane units of either one type have at least methyl groups and Si—H groups, but are free of aromatic hydrocarbon groups. The other organic groups in these siloxane units include monovalent hydrocarbon groups of 1 to 20 carbon atoms, exclusive of aromatic hydrocarbon groups, for example, alkyl groups such as ethyl, propyl, butyl, hexyl and decyl, cycloalkyl groups such as cyclohexyl, and alkenyl groups such as vinyl and allyl. These organic groups may further contain various functional groups such as epoxy, carboxyl, carboxylic anhydride, amino and mercapto groups. Of these, $C_{1-8}$ alkyl and alkenyl groups are preferred, with $C_{1-4}$ alkyl groups such as ethyl and propyl and vinyl being most preferred.

The Si—H content of the organopolysiloxane (C) is not critical although a Si—H content of at least 0.1 mol/100 g is preferred from the standpoint of flame retardance. The "Si—H content" as used herein represents the moles of Si—H groups contained per 100 g of the organopolysiloxane. This content can be determined by measuring the volume per unit weight of hydrogen gas evolving from an organopolysiloxane on alkali decomposition. For example, when 122 ml of hydrogen gas evolves per gram of an organopolysiloxane and at 25° C., the Si—H content is computed to be 0.5 mol/100 g according to the following equation.

$$122 \times 273/(273+25) \div 22400 \times 100 \approx 0.5$$

In the invention, an organopolysiloxane having a Si—H content in the range of 0.1 to 1.6 mol/100 g is preferably used as component (C).

The molecular weight of the organopolysiloxane (C) used herein is not critical. From the standpoints of dispersion in the aromatic polycarbonate resin and improved mobility during combustion, the weight average molecular weight is preferably set at 10,000 or below. If the molecular weight is too low, the organopolysiloxane contains more components that volatilize out of the system during melt mixing with the resin, which fails to exert flame retardant effects and can cause failure, especially molding faults due to volatile components. Therefore, the organopolysiloxane (C) used preferably has a weight average molecular weight in the range of 600 to 10,000, and more preferably 1,000 to 8,000.

The organopolysiloxane containing silicon atom-bonded methyl groups and Si—H groups in a molecule and free of an aromatic hydrocarbon group can be prepared by well-known methods. For example, the end organopolysiloxane can be produced by subjecting a mixture of organochlorosilanes corresponding to the particular structure of the end product to co-hydrolysis, while removing hydrochloric acid and low-boiling by-products. Alternatively, when silicone oils, cyclic siloxanes or alkoxysilanes containing organic residues (such as methyl) or Si—H bonds in the molecule are used as the starting material, polymerization reaction is carried out in the presence of an acid catalyst such as hydrochloric acid, sulfuric acid or methanesulfonic acid, and optionally with water added for hydrolysis. After the acid catalyst used and low-boiling by-products are similarly removed, the end organopolysiloxane is obtained.

In the composition of the invention, the organopolysiloxane (C) containing silicon atom-bonded methyl groups and Si—H groups in a molecule and free of an aromatic hydrocarbon group should be added in amounts of 0.1 to 9.9 parts by weight, preferably 0.2 to 3 parts by weight, per 100 parts by weight of component (A). Less than 0.1 part of the methyl and Si—H group-bearing organopolysiloxane (C) is insufficient to achieve the desired flame retarding effects whereas more than 9.9 parts achieves no further improvement in flame retardance and rather has adverse impacts on the outer appearance and strength of molded parts.

It is noted that the amount of all organopolysiloxane components, that is, the total of components (B) and (C) is 0.2 to 10 parts by weight, preferably 0.3 to 5 parts by weight, per 100 parts by weight of component (A). Too large a proportion of organopolysiloxane components achieves no further improvement in flame retardance and has adverse impacts on the outer appearance and strength of molded parts.

In a preferred embodiment of the invention, (D) an organic alkali metal salt and/or an organic alkaline earth metal salt is added to the flame retardant resin composition because a further improvement in flame retardance is achieved. This salt serves as a carbonization promoter for facilitating formation of a flame retarded layer during combustion. Those metal salts which are known in the art to render conventional polycarbonate resins flame retardant are applicable to the inventive composition. The salts may be used alone or in admixture of any.

While a variety of organic alkali and alkaline earth metal salts are known, alkali and alkaline earth metal salts of organic acids or organic acid esters having at least one carbon atom are preferably used. Examples of suitable organic acids or organic acid esters include organic sulfonic acids, organic carboxylic acids, and organic phosphoric acid esters. Examples of the alkali metal include lithium, sodium, potassium, and cesium, and examples of the alkaline earth metal include magnesium, calcium, strontium, and barium. Accordingly, useful organic alkali and alkaline earth metal salts include alkali and alkaline earth metal salts of organic sulfonic acids, organic carboxylic acids, and organic phosphoric acid esters, with the alkali and alkaline earth metal salts of organic sulfonic acids being more preferred.

Illustrative examples of the alkali and alkaline earth metal salts of organic sulfonic acids include alkali and alkaline earth metal salts of sulfonic acids having a perfluoroalkane group of 1 to 8 carbon atoms such as perfluoromethanesulfonic acid, perfluoroethanesulfonic acid, perfluoropropanesulfonic acid, perfluorobutanesulfonic acid, perfluorohexanesulfonic acid, peprfluoroheptanesulfonic acid, and perfluorooctanesulfonic acid; and alkali and alkaline earth metal salts of aromatic sulfonic acids such as benzenesulfonic acid, 2,5-dichlorobenzenesulfonic acid, naphthalene-2,6-disulfonic acid, diphenylsulfone-3-sulfonic acid, and diphenylsulfone-3,3'-disulfonic acid. Of these, alkali metal salts of perfluoroalkanesulfonic acids are preferred.

When the organic alkali metal salt and/or organic alkaline earth metal salt (D) is included in the flame retardant resin composition of the invention, the metal salt is preferably added in an amount of 0.01 to 3 parts by weight per 100 parts by weight of component (A). Less than 0.01 part of the metal salt may fail to achieve the desired effect whereas more than 3 parts of the metal salt achieves no further improvement in the additive effect and can adversely affect the thermal stability and strength of the flame retardant resin composition or molded parts thereof. More preferably, the organic alkali or alkaline earth metal salt is added in an amount of 0.05 to 2 parts by weight.

In another preferred embodiment of the invention, (E) platinum and/or a platinum compound is added to the flame retardant resin composition whereby a further improvement in flame retardance is achieved. Presumably the platinum or platinum compound serves as a crosslinking catalyst when the organopolysiloxane crosslinks to form a flame retarded layer during combustion and as a co-catalyst for assisting the organopolysiloxane in capturing radicals generated during combustion.

As the platinum or platinum compound, platinum catalysts may be used which are conventionally used in the hydrosilylation reaction of Si—H group-bearing compounds with unsaturated group-bearing compounds, the dehydrogenation condensation reaction of Si—H group-bearing compounds with hydroxyl group-bearing compounds, and the like. Examples include chloroplatinic acid, alcohol solutions of chloroplatinic acid, the reaction products of chloroplatinic acid with alcohols, the reaction products of chloroplatinic acid with olefins, the reaction products of chloroplatinic acid with vinyl group-bearing siloxanes, and chlorine-neutralized products of chloroplatinic acid. For allowing the flame retardant resin composition (to which the platinum catalyst is added) to maintain physical properties and preventing molded parts from causing corrosion to adjacent electronic parts, it is preferred to use as the platinum catalyst chlorine-neutralized products of chloroplatinic acid, that is, chloroplatinic acid whose chlorine value is neutralized with a neutralizing agent such as sodium hydrogen carbonate and which has a vinyl group-bearing organopolysiloxane coordinated thereto. Such treated platinum compounds are readily available.

The platinum or platinum compound is added in a minor amount because it serves as a catalyst. Preferably it is added in an amount of 0.1 to 2,000 ppm, more preferably 1 to 500 ppm of platinum metal based on the weight of component (A). In the case of a platinum compound, it is preferably used in the form of a dilute solution having a platinum content of 0.1 to 10% by weight, more preferably 0.5 to 5% by weight. Too small a platinum quantity may fail to achieve the desired effect whereas too large a platinum quantity may provide no improvement in flame retardance and cause the flame retardant resin composition or molded parts thereof to be colored.

For the solution of platinum compound, various diluents may be used, for example, alcohols such as ethanol, isopropyl alcohol, n-butanol and isobutanol, aromatic solvents such as toluene and xylene, and silicone compounds such as cyclic siloxanes, linear siloxanes, and vinyl group-bearing siloxanes. Use of non-volatile silicone compounds is recommended from the standpoints of volatility or danger during high-temperature kneading with the resin and compatibility with concurrently added organopolysiloxanes (B) and (C).

In addition to the aforementioned components, other customary additives may be added to the flame retardant resin composition of the invention during the kneading or molding step depending on their purpose, insofar as they do not compromise the physical properties of the composition. Exemplary additives include colorants, fillers, stabilizers, elastomers other than the thermoplastic resin used as component (A), reinforcements (e.g., carbon fibers), UV absorbers, lubricants, mold release agents, plasticizers, flow modifiers, antistatic agents, and dispersants.

The colorants used herein are not critical and any commonly used colorants are useful. The colorants may be either pigments or dyes or combinations thereof. Use may be made of one or more of inorganic colorants, organic colorants and oil-soluble dyes.

The fillers used herein are not critical and any commonly used fillers are useful. Exemplary fillers include mica, carbon black, silica, whiskers such as potassium titanate whiskers, titanium oxide whiskers and zinc oxide whiskers, fibers such as glass fibers and carbon fibers, calcium carbonate, barium sulfate, glass flakes, glass beads, milled glass, talc, clay and wollastonite. The shape and average particle size of these fillers are not particularly limited.

The stabilizers used herein are not critical and any commonly used stabilizers are useful. Exemplary stabilizers include thermal stabilizers, antioxidants, photo-stabilizers, and polymerization inhibitors.

The elastomers other than the thermoplastic resin used as component (A) include naturally occurring and synthetic polymeric materials which are elastomers at room temperature. Examples include natural rubber, butadiene polymers, isoprene polymers, isobutylene polymers, styrene-isoprene copolymers, isobutylene-butadiene copolymers, ethylene-propylene copolymers, ethylene-propylene-diene copolymers, polyurethane rubber, polyether rubber and epichlorohydrin rubber.

In preparing the flame retardant resin composition of the invention, any conventional method may be employed. Most often, the composition is prepared by combining components (A), (B) and (C), further combining optional components (D) and (E) and other additives therewith, and mixing them. The order of mixing these components is not critical. In order that the polymer alloy type resin composition exert more flame retardant effects, the resin composition is preferably prepared by premixing the aromatic polycarbonate resin with the organopolysiloxane (B) to form a first flame retardant compound, premixing the thermoplastic resin other than the aromatic polycarbonate resin with the organopolysiloxane (C) to form a second flame retardant compound, and melt mixing the first and second flame retardant compounds. When it is desired to blend component (D) and/or (E), the component(s) may be added at any point of time during the process.

In the combining and mixing steps, any of conventional apparatus for rubbers and plastics may be employed. Using any desired one of ribbon blenders, Henschel mixers, Banbury mixers, drum tumblers, single screw extruders, twin screw extruders, co-kneaders, multiple screw extruders, the end composition can be prepared.

Using well-known molding techniques, the flame retardant resin composition thus obtained can be molded into a variety of molded parts, typically electric appliance parts. Suitable molding techniques include injection molding, hollow casting, extrusion molding, compression molding, vacuum forming, calendering, and rotational molding.

EXAMPLE

Preparation Examples, Examples and Comparative Examples are given below for further illustrating the present invention. These examples are not construed to limit the invention thereto.

The structure of each organopolysiloxane obtained in Preparation Examples was determined by $^{29}$Si—NMR and $^1$H—NMR. The weight average molecular weight (Mw) was determined by gel permeation chromatography (GPC) using polystyrene standards to construct a calibration against which the organopolysiloxane was measured. The Si—H content of Si—H group-bearing organopolysiloxane was determined by measuring the volume per unit weight of hydrogen gas evolving from the organopolysiloxane upon alkali decomposition as previously defined. In Preparation Examples, the structure of a phenyl group-bearing organopolysiloxane is represented by the average compositional formula in which Ph, Me and Vi stand for phenyl, methyl and vinyl, respectively; and the structure of a Si—H group-bearing organopolysiloxane is represented by the rational formula in which symbols M, D and T stand for the following siloxane units, and the coefficients associated with the respective symbols indicate the degree of polymerization of siloxane units per molecule.

M: $(CH_3)_3SiO_{1/2}$ unit
$M^H$: $H(CH_3)_2SiO_{1/2}$ unit
D: $(CH_3)_2SiO$ unit
$D^H$: $H(CH_3)SiO$ unit
$D^{\Phi 2}$: $(C_6H_5)_2SiO$ unit
$T^\Phi$: $(C_6H_5)SiO_{3/2}$ unit Preparation Example 1

A 1-liter flask equipped with a stirrer, condenser and thermometer was charged with 288 g of water and 93 g of toluene and heated to an internal temperature of 80° C. in an oil bath. A dropping funnel was charged with 148 g of phenyltrichlorosilane, 51 g of diphenyldichlorosilane and 13 g of dimethyldichlorosilane, which with stirring, was added dropwise to the flask over one hour. At the end of dropwise addition, stirring was continued for one hour at the internal temperature of 80° C. for ripening. With stirring, 27 g of trimethylchlorosilane was then added dropwise to the flask over 10 minutes. At the end of dropwise addition, stirring was continued for 30 minutes at the internal temperature of 80° C. for ripening. Toluene, 100 g, was then added to the reaction solution, which was allowed to stand while cooling down to room temperature whereupon the aqueous layer separated. After removal of the aqueous layer, a 10% sodium sulfate aqueous solution was combined with the toluene layer. After 10 minutes of stirring, the mixture was allowed to stand for 30 minutes whereupon the aqueous layer separated was removed. This water washing step was repeated until the toluene layer became neutral, whereby the reaction was stopped. With an ester adapter attached to the flask, the toluene layer containing an organopolysiloxane was heated to reflux whereby water was removed from the toluene layer. After the internal temperature reached 110° C., refluxing was continued for a further one hour, followed by cooling to room temperature. The resulting organopolysiloxane solution was filtered of insolubles and subsequently distilled in vacuum to remove the toluene and low molecular weight siloxanes, yielding phenyl group-bearing organopolysiloxane B-1 in solid form.

This phenyl group-bearing organopolysiloxane B-1 contains phenyl and methyl groups as silicon atom-bonded substituent groups within the molecule and has a branched structure. When it is represented by the average compositional formula: $R^1{}_m R^2{}_n (OR^3)_p (OH)_q SiO_{(4-m-n-p-q)/2}$, $R^2$ is methyl, m is 0.93, n is 0.62, p is 0, q is 0.03, m+n+p+q=1.58, as in the following formula.

$$(Ph)_{0.93}(Me)_{0.62}(OH)_{0.03}SiO_{2.42/2}$$

It had a weight average molecular weight of 9,200 and a softening point of 96° C.

Preparation Example 2

A 1-liter flask equipped with a stirrer, condenser and thermometer was charged with 80.7 g of vinyltrichlorosilane, 77.4 g of dimethyldichlorosilane, 227.9 g of diphenyldichlorosilane and 100 g of toluene and heated to an internal temperature of 40° C. in an oil bath. A dropping funnel was charged with 80 g of methanol, which with stirring, was added dropwise to the flask over one hour. Alkoxylation reaction proceeded while the hydrochloric acid gas evolving during the reaction was removed out of the system. At the end of dropwise addition, stirring was continued for one hour at the internal temperature of 40° C. for ripening. Next the dropping funnel was charged with 23.4 g of water, which with stirring, was added dropwise to the flask over one hour. Hydrolytic condensation reaction proceeded while the hydrochloric acid gas evolving during the reaction was removed out of the system. Stirring was continued for a further 2 hours at an internal temperature of 68° C. for ripening. Sodium carbonate, 5.3 g, was added to the solution which was stirred for one hour at an internal temperature of 60° C. whereby the remaining hydrochloric acid was neutralized. Subsequently, the methanol, toluene and low molecular weight siloxanes were removed by vacuum distillation, and the insolubles were removed by filtration, yielding phenyl group-bearing organopolysiloxane B-2 in liquid form.

This phenyl group-bearing organopolysiloxane B-2 contains phenyl, methyl, vinyl and methoxy groups as silicon atom-bonded substituent groups within the molecule. When it is represented by the average compositional formula: $R^1_m R^2_n (OR^3)_p (OH)_q SiO_{(4-m-n-p-q)/2}$, $R^2$ is methyl and vinyl, $R^3$ is methyl, m is 0.9, n is 0.85, p is 0.75, q is 0.01, m+n+p+q=2.51, as in the following formula.

$$(Ph)_{0.9}(Me)_{0.6}(Vi)_{0.25}(OMe)_{0.75}(OH)_{0.01}SiO_{1.49/2}$$

It had a weight average molecular weight of 780.

Preparation Example 3

A 1-liter flask equipped with a stirrer, condenser and thermometer was charged with 537.6 g of water and 120 g of toluene and cooled to an internal temperature of 5° C. A dropping funnel was charged with 12.6 g of trimethylchlorosilane, 120.1 g of methyldichlorosilane and 36.7 g of diphenyldichlorosilane, which with stirring, was added dropwise to the flask over two hours. Cooling was continued for this duration so as to maintain the internal temperature at or below 20° C. At the end of dropwise addition, stirring was continued for 4 hours at the internal temperature of 20° C. for ripening. This was allowed to stand whereupon the aqueous hydrochloric acid layer separated. After removal of the aqueous layer, 80 g of a 10% sodium carbonate aqueous solution was added to the toluene layer. After 5 minutes of stirring, the mixture was allowed to stand whereupon the aqueous layer separated was removed. This was followed by three times of washing with deionized water until it was confirmed that the toluene layer became neutral. The toluene solution was heated in vacuum to an internal temperature of 120° C. to remove toluene and low-boiling values. The insolubles were then removed by filtration, yielding phenyl group-bearing organopolysiloxane B-3 in liquid form.

This phenyl group-bearing organopolysiloxane B-3 contains phenyl, methyl and Si—H groups as silicon atom-bonded substituent groups within the molecule. When it is represented by the average compositional formula: $R^1_m R^2_n (OR^3)_p (OH)_q SiO_{(4-m-n-p-q)/2}$, $R^2$ is hydrogen and methyl, m is 0.22, n is 1.87, p is 0, q is 0.02, m+n+p+q=2.11, as in the following formula.

$$(Ph)_{0.22}(Me)_{1.07}(H)_{0.8}(OH)_{0.02}SiO_{1.89/2}$$

Its structure has the rational formula: $M_2 D^H_{18} D^{\Phi 2}_{2.5}$. It had a Si—H content of 1.07 mol/100 g and a weight average molecular weight of 3,600.

Preparation Example 4

A 1-liter flask equipped with a stirrer, condenser and thermometer was charged with 135.3 g of 1,1,3,3-tetramethyl-disiloxane, 74.7 g of octamethylcyclotetrasiloxane, 196.9 g of diphenyldimethoxysilane and 199.8 g of phenyltrimethoxysilane. With stirring, 25.0 g of conc. sulfuric acid was added thereto. The flask was cooled to an internal temperature of 10° C. With stirring, 42.6 g of water was added dropwise to the flask over 30 minutes. Cooling was continued for this duration so as to maintain the internal temperature at or below 20° C. Stirring was continued for 5 hours at the internal temperature of 10–20° C. for ripening. Then 8.5 g of water and 300 g of toluene were added to the solution, which was stirred for 30 minutes. This was allowed to stand whereupon the aqueous layer separated was removed. Thereafter, the toluene layer was washed four times with a 5% sodium sulfate aqueous solution until it was confirmed that the toluene layer became neutral. The toluene solution was heated in vacuum to an internal temperature of 120° C. to remove toluene and low-boiling values. The insolubles were then removed by filtration, yielding phenyl group-bearing organopolysiloxane B-4 in liquid form.

This phenyl group-bearing organopolysiloxane B-2 contains phenyl, methyl and Si—H groups as silicon atom-bonded substituent groups within the molecule. When it is represented by the average compositional formula: $R^1_m R^2_n (OR^3)_p (OH)_q SiO_{(4-m-n-p-q)/2}$, $R^2$ is hydrogen and methyl, $R^3$ is methyl, m is 0.54, n is 1.67, p is 0.05, q is 0, m+n+p+q=2.26, as in the following formula.

$$(Ph)_{0.54}(Me)_{1.25}(H)_{0.42}(OMe)_{0.05}SiO_{1.74/2}$$

Its structure has the rational formula: $M^H_4 D_2 D^{\Phi 2}_{1.6} T^{\Phi}_2$. It had a Si—H content of 0.43 mol/100 g and a weight average molecular weight of 790.

Preparation Example 5

A 1-liter flask equipped with a stirrer, condenser and thermometer was charged with 91.9 g of hexamethyldisiloxane and 408.1 g of 1,3,5,7-tetramethylcyclotetrasiloxane. With stirring, 15.0 g of conc. sulfuric acid was added thereto. At the end of addition, stirring was continued for 5 hours at an internal temperature of 20–25° C. for ripening. Then 6.4 g of water was added to the solution, which was stirred for one hour. This was allowed to stand whereupon the aqueous layer separated was removed. Thereafter, the siloxane layer was washed four times with a 5% sodium sulfate aqueous solution until it was confirmed that the siloxane layer became neutral. The siloxane layer was heated in vacuum to an internal temperature of 120° C. to remove low-boiling values. The insolubles were then removed by filtration, yielding organopolysiloxane C-1.

This Si—H group-bearing organopolysiloxane C-1 contains only methyl and Si—H groups as silicon atom-bonded substituent groups within the molecule. Its rational formula is $M_2 D^H_{12}$. It had a Si—H content of 1.38 mol/100 g, and a weight average molecular weight of 950.

Preparation Example 6

Organopolysiloxane C-2 was obtained as in Preparation Example 5 except that the flask was charged with 28.5 g of hexamethyldisiloxane, 211.1 g of 1,3,5,7-tetramethylcyclotetrasiloxane and 260.4 g of octamethylcyclotetrasiloxane.

This Si—H group-bearing organopolysiloxane C-2 contains only methyl and Si—H groups as silicon atom-bonded substituent groups within the molecule. Its rational formula is $M_2D_{20}D^H_{20}$. It had a Si—H content of 0.71 mol/100 g, and a weight average molecular weight of 3,100.

Preparation Example 7

Organopolysiloxane C-3 was obtained as in Preparation Example 5 except that the flask was charged with 14.8 g of 1,1,3,3-tetramethyldisiloxane, 26.6 g of 1,3,5,7-tetramethylcyclotetrasiloxane and 458.6 g of octamethylcyclotetrasiloxane.

This Si—H group-bearing organopolysiloxane C-3 contains only methyl and Si—H groups as silicon atom-bonded substituent groups within the molecule. Its rational formula is $M^H_2D_{56}D^H_4$. It had a Si—H content of 0.15 mol/100 g, and a weight average molecular weight of 4,850.

Examples 1–12 & Comparative Examples 1–8

The components shown in Tables 1–3 in the proportions shown in Tables 1–3 were melt mixed in a twin screw extruder model KRC-S1 (Kurimoto Ltd.) at a preset temperature of 260° C. and a screw revolution of 100 rpm, followed by pelletization. After drying at 100° C. for more than 5 hours, the pellets were injection molded into bars (125×13×3.2 mm) for the flame retardant test using an injection molding machine model Klockner F-85 (Klockner Ferromatic Desma) at a cylinder temperature of 260° C., a mold temperature of 70° C., and a screw revolution of 75–80 rpm.

It is noted that in Example 12, first pellets were prepared by melt mixing predetermined amounts of the aromatic polycarbonate resin and organopolysiloxane (B) at a set temperature of 280° C., second pellets were prepared by melt mixing predetermined amounts of the ABS resin and organopolysiloxane (C) at a set temperature of 200° C., the first and second pellets were mixed in an aromatic polycarbonate resin/ABS resin weight ratio of 80/20, components (D) and (E) were added thereto, and all the ingredients were melt mixed prior to injection molding.

The outer appearance of the molded parts was visually observed and rated according to the following criterion.

○: good with no discoloration or silver surface

Δ: some discoloration and/or silver surface x: noticeable discoloration and/or silver surface Flame retardance was rated in accordance with the standards of Underwriter's Laboratories Inc. Bulletin 94, Burning Test for Classifying Plastic Materials (hereinafter referred to as UL-94). After a vertically held test bar was ignited with a burner flame for 10 seconds, a flaming time was measured. This ignition test was performed two times in a single bar and on five bars. A total flaming time resulting from ten ignition tests and a flaming time for the single ignition test were determined, and it was also examined whether or not flaming particles dripped. On the basis of these investigations, the test bar is classified to the ratings V-0, V-1 and V-2. In the Examples, evaluation was made whether or not the test bar met the V-0 rating.

V-0: The total flaming time resulting from five specimens after ignition (ten ignition tests) is within 50 seconds, the flaming time for the single ignition test is within 10 seconds, and none of the specimens drip particles which ignite absorbent cotton.

V-1: The total flaming time resulting from five specimens after ignition (ten ignition tests) is within 250 seconds, the flaming time for the single ignition test is within 30 seconds, and none of the specimens drip particles which ignite absorbent cotton.

V-2: The total flaming time resulting from five specimens after ignition (ten ignition tests) is within 250 seconds, the flaming time for the single ignition test is within 30 seconds, and all the specimens drip particles which ignite absorbent cotton.

It is noted that the abbreviations designating the components in Tables 1–3 have the following meanings.

Component (A)

PC: aromatic polycarbonate resin (LEXAN 141R-111 by General Electric Plastics), dried at 120° C. for 5 hours ABS: ABS resin (TECHNO ABS 150NP by Technopolymer Co., Ltd.), dried at 80° C. for 5 hours Component (B) or (C) Other Than Those of the Foregoing Preparation Examples X (for comparison purpose): dimethylsilicone oil having a viscosity of 50 mm²/s at 25° C. (KF96-50 by Shin-Etsu Chemical Co., Ltd.)

Component (D)

Metal salt: potassium salt of perfluorobutanesulfonic acid (Megaface F-114 by Dainippon Ink & Chemical, Inc.)

Component (E)

Platinum compound: a platinum compound in the form of chloroplatinic acid whose chlorine value is neutralized and which has a vinyl group-bearing organopolysiloxane coordinated thereto, dissolved in nonvolatile silicone oil (CAT-PL-56 by Shin-Etsu Chemical Co., Ltd., platinum content 0.5 wt %)

The results of evaluation are also shown in Tables 1–3.

TABLE 1

| Example | | 1 | 2 | 3 | 4 | 5 | 6 |
|---|---|---|---|---|---|---|---|
| Composition (pbw) | | | | | | | |
| (A) | PC | 80 | 80 | 80 | 80 | 80 | 80 |
| | ABS | 20 | 20 | 20 | 20 | 20 | 20 |
| (B) | B-1 | 1.6 | | | | | |
| | B-2 | | 1.6 | | | 1.6 | 1.6 |
| | B-3 | | | 1.6 | | | |
| | B-4 | | | | 1.6 | | |
| (C) | C-1 | | | | | 0.4 | |
| | C-2 | 0.4 | 0.4 | 0.4 | 0.4 | | |
| | C-3 | | | | | | 0.4 |
| (D) | Metal salt | 0.1 | 0.1 | 0.1 | 0.1 | 0.1 | 0.1 |
| (E) | Platinum compound | | | | | | |
| | Outer appearance | ○ | ○ | ○ | ○ | ○ | ○ |
| | Total flaming time (sec) | 36 | 20 | 23 | 25 | 22 | 29 |
| | Drip | 0/5 | 0/5 | 0/5 | 0/5 | 0/5 | 0/5 |
| | V-0 | Pass | Pass | Pass | Pass | Pass | Pass |

TABLE 2

| Example | | 7 | 8 | 9 | 10 | 11 | 12* |
|---|---|---|---|---|---|---|---|
| Composition (pbw) | | | | | | | |
| (A) | PC | 80 | 80 | 80 | 80 | 80 | 80 |
| | ABS | 20 | 20 | 20 | 20 | 20 | 20 |
| (B) | B-1 | | | | | | |
| | B-2 | 0.5 | 0.3 | 4 | 2 | | 1.6 |
| | B-3 | | | | | | |
| | B-4 | | | | | 1.6 | |
| (C) | C-1 | | | | 1 | 0.4 | |
| | C-2 | 1.5 | 0.3 | 3 | | | 0.4 |
| | C-3 | | | | | | |
| (D) | Metal salt | 0.1 | 0.2 | 0.1 | | | 0.1 |
| (E) | Platinum compound | | | | | 0.2 | 0.1 |
| | Outer appearance | ○ | ○ | Δ | ○ | ○ | ○ |

TABLE 2-continued

| Example | 7 | 8 | 9 | 10 | 11 | 12* |
|---|---|---|---|---|---|---|
| Total flaming time (sec) | 31 | 40 | 18 | 22 | 27 | 15 |
| Drip | 0/5 | 0/5 | 0/5 | 0/5 | 0/5 | 0/5 |
| V-0 | Pass | Pass | Pass | Pass | Pass | Pass |

Note that specimens of Example 12 were prepared by furnishing pellets of PC/B-2 mix=100/2 (by weight) and pellets of ABS/C-2 mix=100/2 (by weight), melt mixing both the pellets together with components (D) and (E), and injection molding the composition.

TABLE 3

| Comparative Example | 1 | 2 | 3 | 4 | 5 | 6 | 7 | 8 |
|---|---|---|---|---|---|---|---|---|
| Composition (pbw) | | | | | | | | |
| (A) PC | 80 | 80 | 80 | 80 | 80 | 80 | 80 | 80 |
| ABS | 20 | 20 | 20 | 20 | 20 | 20 | 20 | 20 |
| (B) B-2 | 2 | | 1.6 | | 0.05 | 11 | 1.6 | 6 |
| Other than (B)–(C), X | | | | 0.4 | 1.6 | | | |
| (C) C-2 | | 2 | | 0.4 | 0.05 | 0.4 | 11 | 6 |
| (D) Metal salt | 0.1 | 0.1 | 0.1 | 0.1 | 0.2 | 0.1 | 0.1 | 0.1 |
| (E) Platinum compound | | | | | 0.2 | | | |
| Outer appearance | ◯ | ◯ | ◯ | ◯ | ◯ | X | X | X |
| Total flaming time (sec) | 166 | 134 | 312 | 289 | 110 | 75 | 19 | 16 |
| Drip | 5/5 | 3/5 | 5/5 | 5/5 | 4/5 | 1/5 | 0/5 | 0/5 |
| V-0 | Reject | Reject | Reject | Reject | Reject | Reject | Pass | Pass |

It is evident from the results in Tables 1–3 that the molded parts of Examples 1 to 12 were excellent in both outer appearance and flame retardance, whereas molded parts of Comparative Examples 1 to 6 were less flame retardant. Molded parts of Comparative Example 6 were discolored (brown), and noticeable silver surface was observed in Comparative Examples 7 and 8.

There has been described a resin composition in which a specific silicone compound is compounded to render the composition flame retardant at no sacrifice of the outer appearance of molded parts. Eliminating organic halide flame retardants and phosphoric ester flame retardants, the invention is successful in providing a flame retardant resin composition having satisfactory flame retardant effects and safety and minimal environmental load features. Molded articles can be effectively produced from the composition. Therefore, the inventive composition is useful in various commercial applications including the fields of business machines and electric and electronic apparatus and is of great industrial worth.

Japanese Patent Application No. 2002-058571 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:
1. A flame retardant resin composition comprising
(A) 100 parts by weight of a resin comprising 10 to 100% by weight of an aromatic polycarbonate resin and 90 to 0% by weight of a thermoplastic resin other than the aromatic polycarbonate resin,
(B) 0.1 to 9.9 parts by weight of an organopolysiloxane containing silicon atom-bonded phenyl groups in a molecule and having the average compositional formula (1):

$$R^1{}_m R^2{}_n (OR^3)_p (OH)_q SiO_{(4-m-n-p-q)/2} \quad (1)$$

wherein $R^1$ is a phenyl, $R^2$ is hydrogen or a monovalent hydrocarbon group of 1 to 6 carbon atoms excluding phenyl, $R^3$ is a monovalent hydrocarbon group of 1 to 4 carbon atoms, letters m, n, p and q are numbers satisfying $0.1 \leq m \leq 2.0$, $0.2 \leq n \leq 2.5$, $0 \leq p \leq 1.5$, $0 \leq q \leq 0.35$ and $0.9 \leq m+n+p+q \leq 2.8$, and (C) 0.1 to 9.9 parts by weight of an organopolysiloxane containing silicon atom-bonded methyl group and Si—H groups in a molecule and free of an aromatic hydrocarbon group, the amount of components (B) and (C) combined being 0.2 to 10 parts by weight, said organopolysiloxane (B) containing
(1) phenyl, methyl, $C_{1-4}$ alkoxy groups bonded to silicon atoms in a molecule, or
(2) containing silicon atom-bonded phenyl and methyl groups and Si—H groups in a molecule wherein a Si—H content is from 0.1 to 1.2 mol/100 g.

2. The resin composition of claim 1 wherein component (A) is a resin comprising 30 to 95% by weight of an aromatic polycarbonate resin and 70 to 5% by weight of a thermoplastic resin other than the aromatic polycarbonate resin.

3. The resin composition of claim 2 which is obtained by premixing the aromatic polycarbonate resin with the organopolysiloxane (B) to form a first flame retardant compound, premixing the thermoplastic resin other than the aromatic polycarbonate resin with the organopolysiloxane (C) to form a second flame retardant compound, and melt mixing the first and second flame retardant compounds.

4. The resin composition of claim 1 wherein in component (A), the thermoplastic resin other than the aromatic polycarbonate resin is an acrylonitrile-butadiene-styrene copolymer.

5. The resin composition of claim 1 wherein the organopolysiloxane (C) has a Si—H content of 0.1 to 1.6 mol/100 g.

6. The resin composition of claim 1 wherein the organopolysiloxane (B) contains phenyl, and methyl groups bonded to silicon atoms in a molecule and has a branched structure.

7. The resin composition of claim 1 wherein the organopolysiloxane (B) contains phenyl, methyl and $C_{1-4}$ alkoxy groups bonded to silicon atoms in a molecule.

8. The resin composition of claim 1 wherein the organopolysiloxane (B) contains silicon atom-bonded phenyl and methyl groups and Si—H groups in a molecule and has a Si—H content of 0.1 to 1.2 mol/100 g.

9. The resin composition of claim 1 wherein the organopolysiloxane (B) has a weight average molecular weight of 410 to 10,000.

10. The resin composition of claim 1 wherein the organopolysiloxane (C) has a weight average molecular weight of 600 to 10,000.

11. The resin composition of claim 1, further comprising, per 100 parts by weight of component (A), (D) 0.01 to 3 parts by weight of an organic alkali metal salt and/or an organic alkaline earth metal salt.

12. The resin composition of claim 11 wherein component (D) is selected from alkali and alkaline earth metal salts of organic sulfonic acids.

13. An article made by molding the flame retardant resin composition of claim 1.

14. The resin composition of claim 1, wherein component (B) is present in an amount of 0.2 to 4 parts by weight, per 100 parts by weight of component (A).

15. The resin composition of claim 1, wherein component (C) is present in an amount of 0.2 to 3 parts by weight per 100 parts by weight of component (A).

16. The resin composition of claim 14, wherein component (C) is present in an amount of 0.2 to 3 parts by weight per 100 parts by weight of component (A).

* * * * *